(No Model.)
J. M. HUBBELL.
VEHICLE AXLE.
No. 405,356. Patented June 18, 1889.
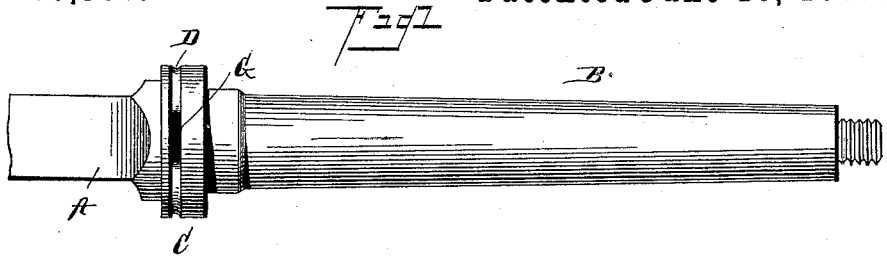
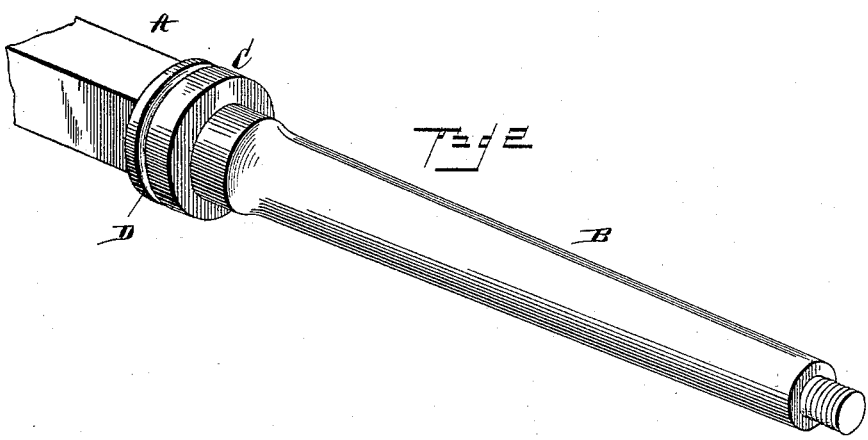
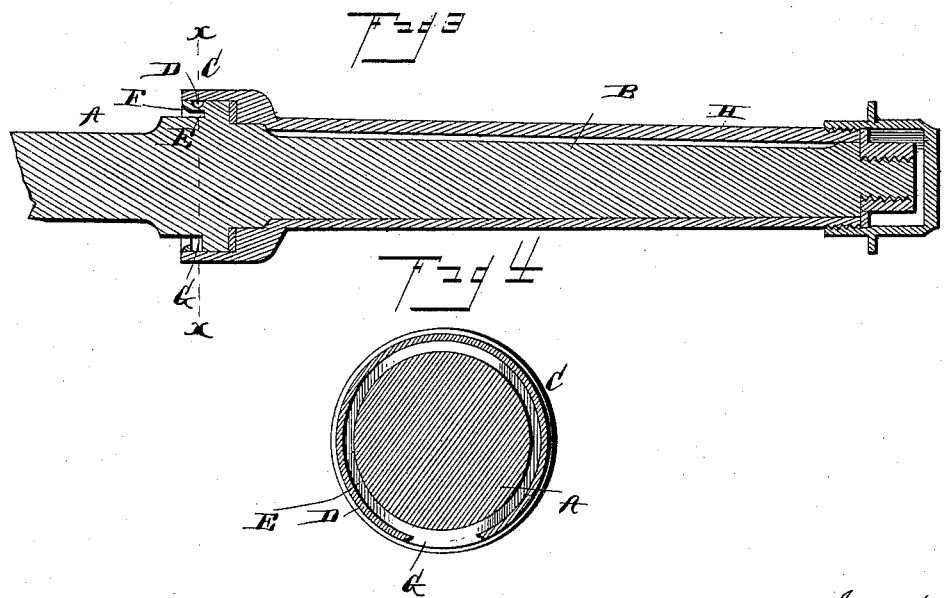
Witnesses,
John Amisie
Wm. Bagger
Inventor,
John M. Hubbell
By his Attorneys
C A Snow & Co

UNITED STATES PATENT OFFICE.

JOHN M. HUBBELL, OF WILKES-BARRÉ, PENNSYLVANIA, ASSIGNOR OF ONE-HALF TO JOHN W. PARMELEE, OF SAME PLACE.

VEHICLE-AXLE.

SPECIFICATION forming part of Letters Patent No. 405,356, dated June 18, 1889.

Application filed March 25, 1889. Serial No. 304,614. (No model.)

*To all whom it may concern:*

Be it known that I, JOHN M. HUBBELL, a citizen of the United States, residing at Wilkes-Barré, in the county of Luzerne and State of Pennsylvania, have invented a new and useful Vehicle-Axle, of which the following is a specification.

This invention relates to vehicle-axles; and it has for its object to so construct the axle that the sand and grit which enter between the inner end of the axle-box and the axle-collar shall not only be prevented from working farther into the bearing between the axle-spindle and the box, but shall be caused gradually to work out at the inner end of the spindle.

With these ends in view the invention consists in the improved construction and arrangement of parts, which will be hereinafter fully described and claimed.

In the drawings, Figure 1 is a bottom view of one end of an axle embodying my improvements. Fig. 2 is a perspective view. Fig. 3 is a longitudinal vertical sectional view. Fig. 4 is a vertical transverse section taken on the line *x x* of Fig. 3.

The same letters refer to the same parts in all the figures.

A designates one end of an axle, and B the spindle.

C is the collar or flange, formed at the inner end of the spindle to form a bearing for the collar of the axle-box. Said flange or collar is provided with an annular groove D, extending around its entire periphery. The inner side of the flange or collar C has an annular undercut recess E, the outer wall of which is made beveled or tapering, as shown at F, so as to merge with the edge of the flange or collar C. The latter is provided in its under side with a transverse slot G, connecting the groove D with the annular cut or recess E.

The axle-box, which is of ordinary construction, is designated by letter H.

The operation of this invention will be readily understood from the foregoing description, taken in connection with the drawings hereto annexed. Any sand or grit which works in between the flange C and the collar of the axle box will first lodge in the annular groove D, which prevents it from working farther in between the spindle and its bearing. By the revolution of the axle-box the stuff that lodges in the groove D will gradually work forward in the latter until it reaches the slot G, when it will pass through said slot into the undercut recess E, from the beveled or sloping wall of which it is readily discharged over the inner edge of the axle-box.

Having thus described my invention, I claim—

1. In a vehicle-axle, an annular flange or collar located at the inner end of the spindle and having an annular undercut recess in its inner side, and a transverse slot communicating with said recess, substantially as set forth.

2. In a vehicle-axle, an annular flange or collar located at the inner end of the spindle and having an annular undercut recess in its inner side, an annular groove, and a slot in the under side of said flange connecting the annular groove with the undercut recess, substantially as set forth.

3. In a vehicle-axle, a flange or collar located at the inner end of the spindle and having an annular undercut recess with a beveled or tapering outer wall, an annular groove, and a slot in the lower side of said flange connecting said groove with the undercut recess, substantially as set forth.

4. In a vehicle-axle, an annular flange or collar located at the inner end of the spindle and provided with an annular undercut recess having beveled or sloping outer wall, and a slot extending through said flange or collar to the undercut recess of the same, substantially as set forth.

In testimony that I claim the foregoing as my own I have hereto affixed my signature in presence of two witnesses.

JOHN M. HUBBELL.

Witnesses:
JOHN W. PARMELEE,
L. D. HILL.